United States Patent [19]
Bryson

[11] Patent Number: 5,316,482
[45] Date of Patent: May 31, 1994

[54] VOCABULARY BOARD GAME

[76] Inventor: Kirk R. Bryson, 434 Lillian Blvd., Holbrook, N.Y. 11741

[21] Appl. No.: 956,169

[22] Filed: Oct. 5, 1992

[51] Int. Cl.⁵ .............................................. G09B 19/22
[52] U.S. Cl. ................................... 434/129; 434/128; 273/243; 273/236
[58] Field of Search ............... 434/128, 129, 167, 170; 273/236, 242, 243, 272, 296, 299, 302

[56] References Cited
U.S. PATENT DOCUMENTS

| | | | |
|---|---|---|---|
| 1,666,996 | 4/1928 | Douglas | 273/299 |
| 3,143,348 | 8/1964 | Carsen et al. | 273/296 |
| 3,984,106 | 10/1976 | White | 273/243 |
| 4,055,347 | 10/1977 | Kreischer | 273/243 |
| 4,496,327 | 1/1985 | Bennett | 273/249 |
| 4,682,777 | 7/1987 | Wood | 273/243 |
| 5,167,503 | 12/1992 | Jordan | 434/128 |
| 5,207,435 | 5/1993 | Tanner | 273/272 X |

Primary Examiner—John G. Weiss
Assistant Examiner—Jeffrey A. Smith
Attorney, Agent, or Firm—Michael I. Kroll

[57] ABSTRACT

A vocabulary board game is provided which consists of a game board, vowel cube playing pieces, a die, a color cube, a star cube, free pass tokens, point tokens, scoring method cards, vocabulary cards, playing position cards, a timer, pencils, pads of paper and storage files for the vocabulary cards. The object of the game is for a player to accumulate as many points as possible to beat the opponents by knowledge of vocabulary words, stopping on the player's own vowel space on the game board by the roll of the die and rolling a star on the star cube.

12 Claims, 4 Drawing Sheets (PLAYER POSITION CARD)

(VOCABULARY CARD)

(SCORING CARD)

VOCABULARY BOARD GAME

BACKGROUND OF THE INVENTION

1. Field of the Invention

The instant invention relates generally to word learning games and more specifically it relates to a vocabulary board game.

2. Description of the Prior Art

Numerous word learning games have been provided in prior art that are adapted to contain learning instructions, such as for different words and have very little opportunity for chance, skill and other enjoyments of the game. For example, U.S. Pat. No. 3,935,651 to Mankoff et al. is illustrative of such prior art. While this unit may be suitable for the particular purpose to which it addresses, it would not be as suitable for the purposes of the present invention as heretofore described.

SUMMARY OF THE INVENTION

A primary object of the present invention is to provide a vocabulary board game that will overcome the shortcomings of the prior art devices.

Another object is to provide a vocabulary board game that is a challenging game of knowledge sprinkled with a little luck, which involves the use of vocabulary words, each having multiple choice answers, arranged on alphabetically separated cards assigned to each letter.

An additional object is to provide a vocabulary board game in which the object of the game is to acquire as many points as possible by answering correctly the vocabulary words asked by a monitor, while there are opportunities to acquire other points as well, wherein lies the sprinkling of luck.

A further object is to provide a vocabulary board game that is simple and easy to use.

A still further object is to provide a vocabulary board game that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
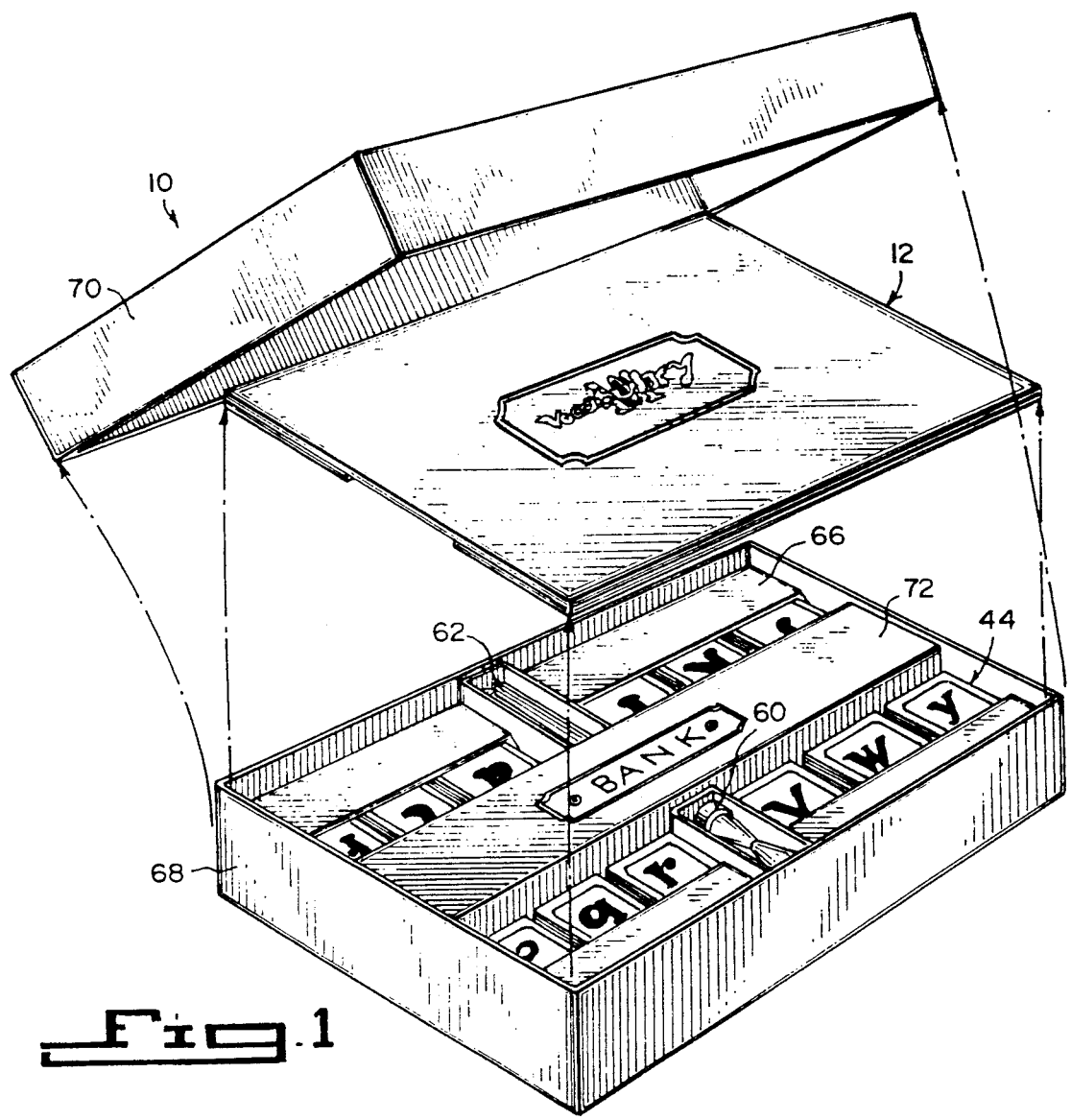
FIG. 1 is a partly exploded perspective view of the game box holding the various components of the instant invention therein.
Figure 2:
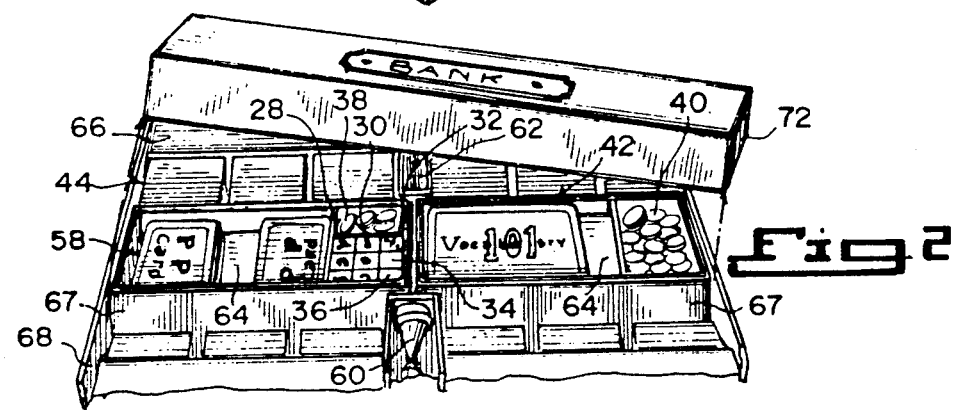
FIG. 2 is a perspective view of a portion of the game box showing the cover of the game parts exploded therefrom.
Figure 3:
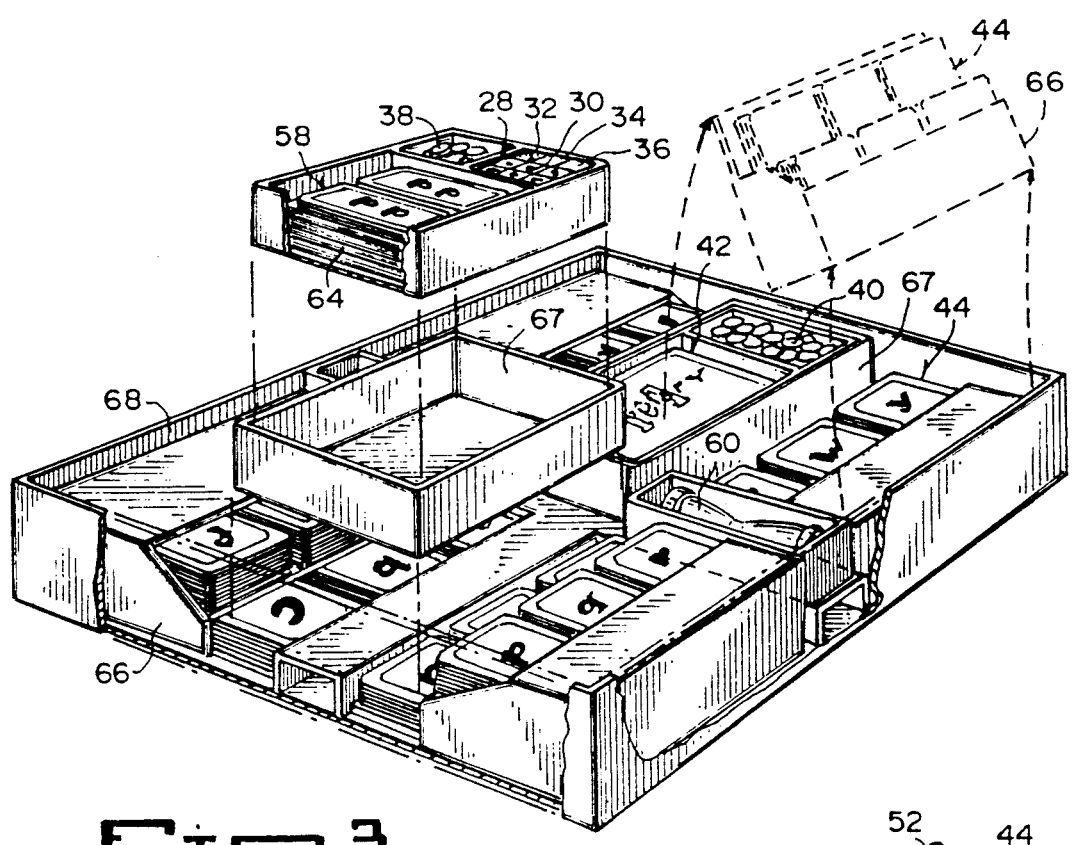
FIG. 3 is a perspective view of the game box with parts broken away with various parts exploded therefrom.
Figure 4:
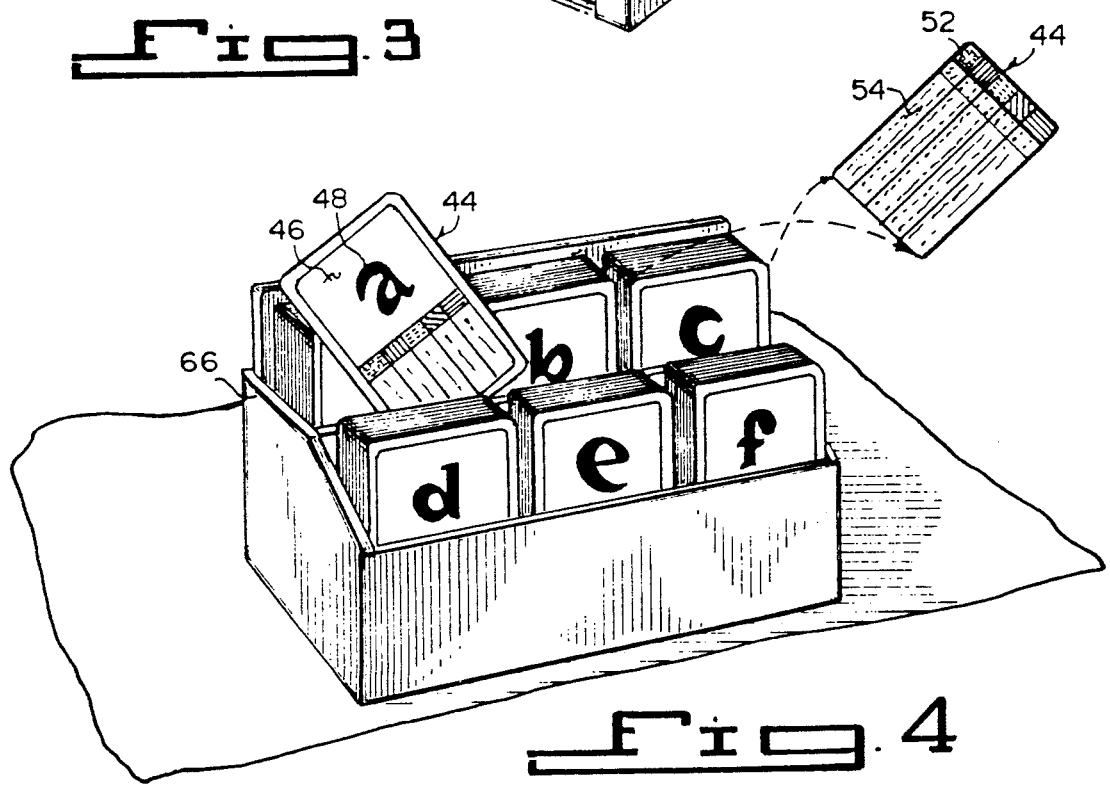
FIG. 4 is a perspective view of one of the storage files for holding some of the vocabulary cards therein.
Figure 5:
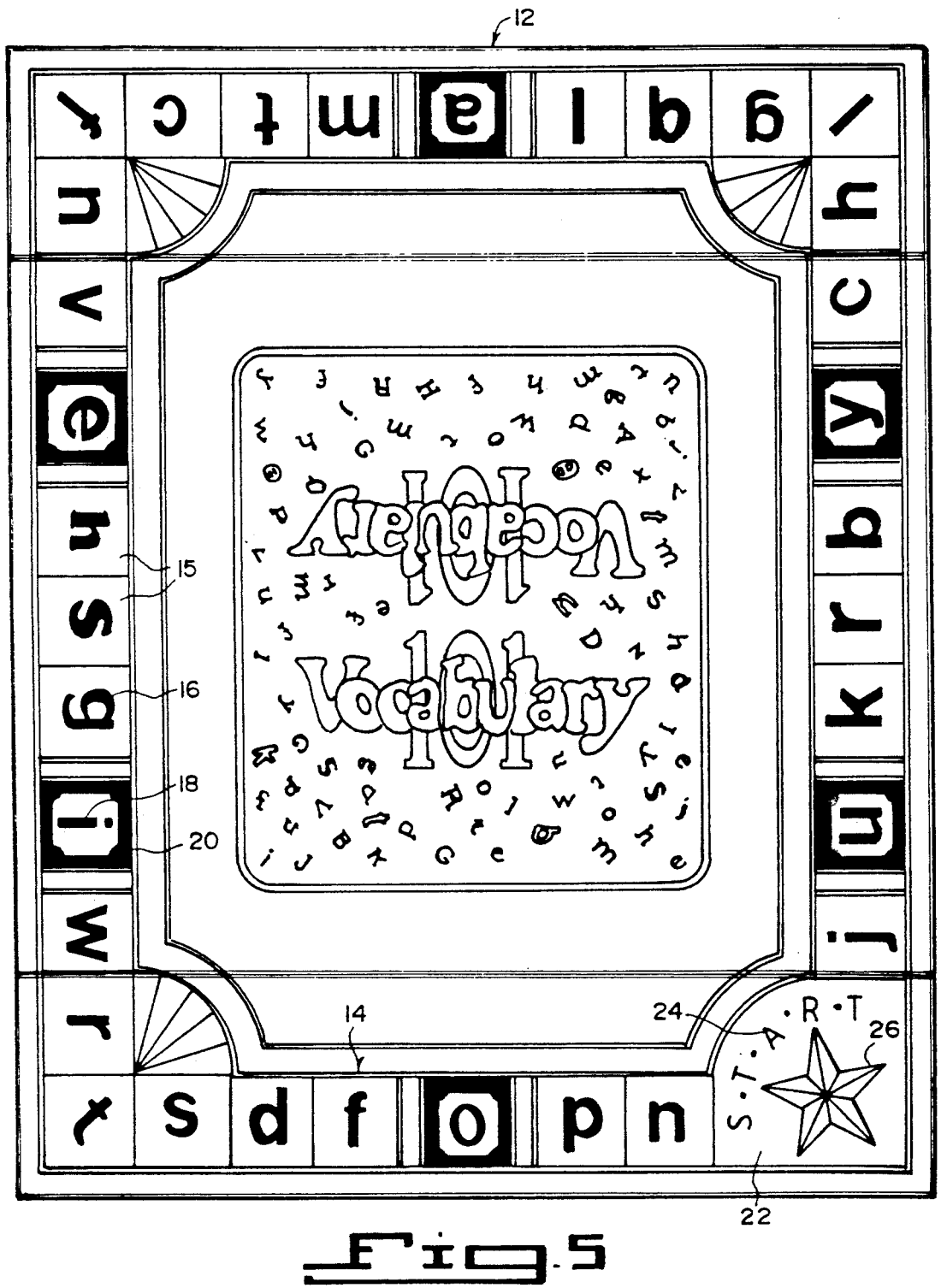
FIG. 5 is a top view of the game board.
Figure 6:
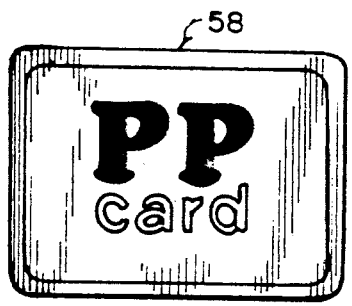
FIGS. 6 and 6A are front and rear views of one typical playing position card.
Figure 6A:
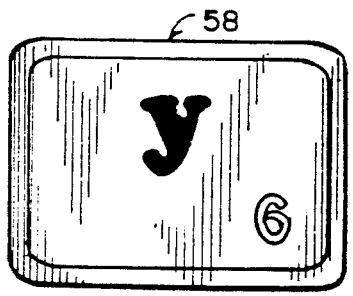
Figure 7:
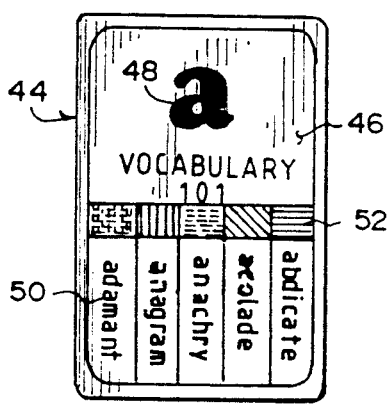
FIGS. 7 and 7A are front and rear views of one typical vocabulary card.
Figure 7A:
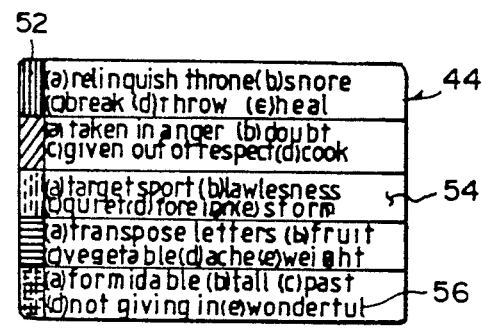
Figure 8:
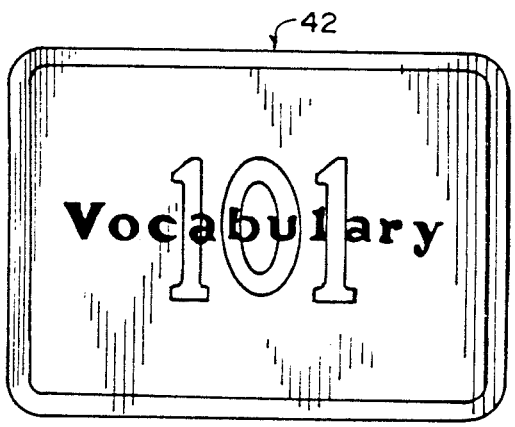
FIGS. 8 and 8A are front and rear views of one typical scoring method card.
Figure 8A:
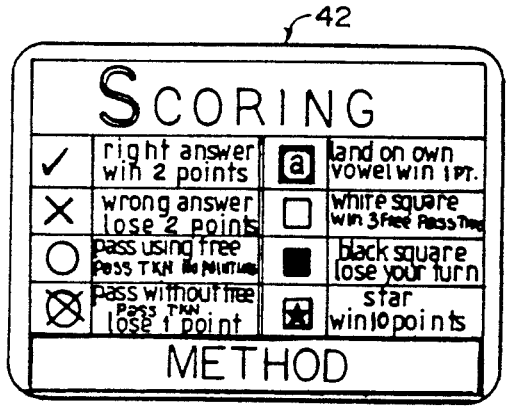

Turning now descriptively to the drawings, in which similar reference characters denote similar elements throughout the several views, the Figures illustrate a vocabulary board game 10 which consists of a game board 12 having a continuous path 14 around its perimeter divided into consecutive spaces 15, each bearing one letter 16 of the alphabet with the vowel letters 18 having a black border 20 and a starting position space 22 with the word start 24 and a star 26 at one corner of the game board 12.

A plurality of playing pieces 28 are provided with one for each of the game players. The playing pieces 28 being of a size to fit within each of the spaces 15 on the game board 12. Each playing piece 28 is a vowel cube 30 identified by one of the vowels, a, e, i, o, u and y on all sides of the vowel cube 30.

A die 32 has a sequence of numbers from one to six on its various sides, so as to indicate the movement of each playing piece 28 to a particular space 15 in the path 14 on the game board 12. A color cube 34 has five colors on its sides to correspond with the colors used in playing the game and a black color on one side which indicates a lost turn. A star cube 36 has a star on one side and a white color on an opposite side and is used when a playing piece 28 lands on the starting position space 22.

A plurality of free pass tokens 38 are provided which are each typically, but not limited to, being white in color. Three of the free pass tokens 38 are given to each player at the start of the game. A plurality of point tokens 40 are also provided in which each are typically, but not limited to, being orange in color. Ten of the point tokens 40 are given to each player at the start of the game. A plurality of scoring method cards 42 are also provided. One of the scoring method cards 42 are given to each player at the start of the game to help understand and follow the scoring during the game.

A plurality of vocabulary cards 44, are dividend into a plurality of decks. Each vocabulary card 44 has on a first side 46, one letter 48 of the alphabet except X and Z, with a plurality of words 50 starting with that letter and each color coded at 52. On a second side 54 are the plurality of color codes 52 matching the first side 46. A plurality of multiple choice answers 56 are for each word 50, with the correct answer for each word 50 in bold lettering.

A plurality of playing position cards 58 are provided. One of the playing position cards 58 is taken by each player at the start of the game to determine who goes first, second, etc., who will be the first monitor and also let each player know which playing piece 28 to use. A timer 60 is activated by the monitor after a word 50 from one vocabulary card 44 is given to the player, so as to time the player for an answer. A plurality of pencils 62 and a plurality of pads of paper 64 are also provided. Each player may use one pencil 62 and one pad 64, to jot down information received from the monitor about the vocabulary word 50. A plurality of storage files 66 are provided with each for holding some of the decks of vocabulary cards 44 in an alphabetical order, so as to be used easily by the monitor. Also provided are a plurality of storage file holders 67 which hold two storage files 66, back to back thus making mobility of the files easier for the monitor.

The vocabulary board game 10 can be stored in a game box 68 with a removable cover 70. A cover 72 for the games paraphernalia can be turned upside down and used as a bank to hold the extra game paraphernalia therein.

RULES OF THE GAME

A game of skill and a small degree of luck played with up to six players. Twelve may participate when playing partners.

Object

Accumulate as many points as possible to beat your opponents by:
a) knowledge of vocabulary words;
b) stopping on your own vowel through the roll of the die; and
c) rolling "Star" on the Star Cube.

Length

Players, by mutual agreement opt to end game either after predetermined time span or point limitation.

| CONTENTS: | 1   | Game Board,                 |
|-----------|-----|-----------------------------|
|           | 6   | Vowel Cube Playing Pieces,  |
|           | 1   | Die,                        |
|           | 1   | Color Cube,                 |
|           | 1   | Star Cube,                  |
|           | 72  | Free Pass Tokens,           |
|           | 1   | Bank,                       |
|           | 200 | Point Tokens.               |
|           | 6   | Scoring Method Cards,       |
|           | 1   | Timer,                      |
|           | 600 | Vocabulary Cards,           |
|           | 6   | Playing Position Cards,     |
|           | 6   | Pad of Paper; and           |
|           | 6   | Pencils.                    |

EXPLANATIONS

For Clarity, the participants will hereafter be identified in the Rules as follows: PARTICIPANT, PLAYER, MONITOR and STANDBY.

Participant

There are six in all, unless playing partners. Each participant, during the course of the game will either be, the player, monitor or standby several times. Each participant will equip him or herself with a vowel cube playing piece, a pad of paper, pencil and scoring card. The vowel cube playing piece is determined by the playing position card picked at the start of the game. Each participant receives from the bank three "Free Pass Tokens" and ten "Point Tokens". Each participant, as he/she becomes the player will roll the die and move around the board in accordance with the number rolled.

Player

The player is the one with the die. "He/She Is Up". "It's His/Her Turn". The first player up will be determined by the playing position card picked by each participant at the outset. Play always progresses counter-clockwise.

Monitor

The one immediately to the left of the player acts as monitor. The monitor handles the card file, timer, and bank. As each player has his/her turn a new monitor takes over these duties performing them for the player on his/her right.

Standby

All other participants awaiting their turn.

Game Board

The perimeter of the game board is surrounded by letters of the alphabet, totaling thirty three. There is no "X" and no "Z" as there are very few words starting with those letters. The "Y" has been retained because it is one of the vowels and represents the sixth game piece. Again, there are a limited number of words starting with "Y" and so those cards will have instructions on the reverse as to how to proceed. Some of the letters on the game board have been duplicated. This in no way alters the procedure. This has been done merely to balance out the game board.

The vowel letters a, e, i, o, u and y are isolated from the letters by black boarders to bring them to the players eye as they can mean extra points, explained in the rules. The corner, designated the "Starting Position" has no letter, but rather a "Star". This could also means extra points, explained in the rules.

Vowel Cube

Playing piece. There are six in all, one for each participant. Each vowel cube playing piece is identified by one of the vowels, a, e, i, o, u and y. The vowel cube playing piece used by each participant is determined by the playing position card picked by that participant. Whenever he/she lands on a vowel space corresponding with his/her vowel cube playing piece that player wins one point.

Die

Play starts from the "Starting Position" space and number rolled on the die determines number of spaces the vowel cube playing piece is moved. All subsequent rolls are from player's last position. The die and color cube are rolled together.

Color Cube

There are five colors on the color cube and one black side. The five colors correspond with the five colors on the six hundred Vocabulary Cards, which identify the five words appearing thereon. The color rolled by the player dictates which word is asked of him/her by the monitor.

If the player rolls black he/she loses a turn and assumes duties of the monitor. Next player is up and gets the die and color cube.

NOTE

Only the die and the color cube are rolled when first leaving the starting position space and throughout future play. The Star Cube may also be rolled from the starting position space, but only under certain circumstances, explained under caption, STAR CUBE.

Star Cube

This cube has a star on one side and a white square on the opposite side. Any player whose roll of the die lands him/her on the Starting Position space during play is entitled to roll the Star Cube, UNLESS player arrived there with black showing on the Color Cube. In this case player forfeits chance to roll the Star Cube and loses his/her turn. Player then takes over duties of monitor and next player is up.

If player arrived on Starting Position space with one of the five colors on the color cube, he/she retains that color until completion of that play. Player now rolls the Star Cube and the die. The roll of the die will determine what letter player will proceed to using previously rolled color. Star cube will determine if player is entitled to any extra perks.

If Star shows on the star cube, player gets ten points PROVIDED he/she gives correct answer to vocabulary word asked by monitor. This ten points is in addition to the normal two points for a correct answer. Should the correct answer NOT be given, player does not get the ten points and loses two points for an incorrect answer.

If white comes up on the Star Cube player receives three Free Pass Tokens whether vocabulary word is answered correctly or not.

Free Pass Tokens

They are the white tokens and there are seventy two of them. Each player gets three at the start of the game. Additional free pass tokens may be acquired during the game, but their acquisition is purely through luck.

These free pass tokens are valuable in that they allow the player to pass on a particular word he/she may find difficult without suffering a penalty, (loss of points). Since the player has only three it is strongly advised not to use them indiscriminately.

In order to replace them one must first have the opportunity to roll the Star Cube, which has on it's opposite side a white square. When this white square is rolled the player gets three more Free Pass Tokens. But the player must be lucky enough to roll the white square when and if he/she is lucky enough to have the opportunity to roll the Star Cube.

Without any Free Pass Tokens player forfeits one point each time he/she passes on a word.

NOTE

Any Free Pass Tokens lost MUST be returned to the bank.

Bank

This function is handled by whomever is performing the duties of the Monitor. The cover of the game paraphernalia, when inverted serves as the bank depository. In here are kept any vowel cube playing pieces, scoring method cards, pads of paper and pencils not being used as well as the Star Cube.

This also serves as storage for the Free Pass Tokens, Point Tokens and Playing Position Cards.

Point Tokens

They are the orange tokens and there are two hundred of them. Each participant starts out with ten point tokens, which is equivalent to a starting score of ten points. They are given out by the monitor from the bank. The monitor also disperses these point tokens as they are won and collects them when they are lost.

During play these point tokens are won by:
a) Correctly answering vocabulary words.
b) Landing on own vowel space after rolling die.
c) Receiving points for rolling a Star.
Point Tokens may also be lost by:
a) Incorrect answer to vocabulary word.
b) Passing on a particular word without use of Free Pass Token.
NOTE:

Any point tokens lost MUST be returned to bank.

Scoring Method Cards

Each player takes a Scoring Method Card at start of game. This card will help in understanding and following the scoring.

If Player

| | |
|---|---|
| Answers correctly | Wins two points |
| Answers incorrectly | Loses two points |
| Passes on word using Pass Token | No loss of Free points |
| Passes on word without using Free Pass Token | Losing one point |
| Lands on own vowel space with roll of die | Wins one point |
| Rolls White square on Star Cube | Wins three Free Pass Tokens |
| Rolls Star on Star Cube | Wins ten points IF correct answer given to vocabulary word |
| Rolls Black square on the color cube | Loses turn |

Timer

Timer is activated by the monitor after the word from the vocabulary card has been given to the player and he/she has had time to write it down along with the five multiple choices. At the end of the prescribed time the player must answer or pass on the word.

Vocabulary Cards

There are six hundred alphabetical vocabulary cards in this file. Twenty five of each letter of the alphabet except X and Z. This card file is maintained by the monitor.

On the face of each card are five vocabulary words, each one color coded to correspond with the colors on the color cube. Five words, five colors.

On the reverse of each card appear the same five colors. After each color there are listed five multiple choice answers, a, b, c, d and e. Each group of answers corresponds with that color on the front of the vocabulary card. The correct answer is printed in bold lettering for easy identification by the monitor.

There are not enough vocabulary words starting with the letters X and Z, therefore they have been omitted. The letter Y also does not have a sufficient number of vocabulary words starting with it BUT "Y" is one of the vowels and represents a game piece, so it remains on the board and in the card file. To deal with this problem the reverse of the "Y" cards instruct player to, either proceed to another designated letter or to own vowel space where player collects one point. Some of the "Y" cards may have vocabulary words.

These cards are arranged alphabetically in four separate storage files. Each storage file holds six letters of the alphabet with twenty five cards to each letter, ie. letter A has twenty five cards, letter B has twenty five cards and so on. The storage files are placed back to back, two to a box for easy mobility during play.

When player rolling die has completed his/her turn and passes die to next player, he/she takes over duties of the monitor thus controlling the storage file, bank and timer for the next die roller and so on.

After the player rolls the die and a letter and color are arrived at, the monitor picks the appropriate alphabetical vocabulary card and reads the word corresponding to the color rolled by the player on the color cube. The monitor is responsible for declaring whether the answer given is correct or incorrect and assigning any points or imposing penalties.

When monitor finishes with each vocabulary card it shall be returned to the card storage file and placed at the rear of the stack under the appropriate letter.

Playing Position Cards

They are orange and marked PP card on the front. They are also the first items to be used. There are six, one for each participant and determine who goes first, second, etc. They determine who will be the first monitor and also let each participant know which vowel cube playing piece he/she will use.

On the reverse of each playing position card is a vowel followed by a number: (a-1), (e-2), (i-3), (o-4), (u-5) and (y-6).

The stack of playing position cards is placed vowel and number side down and each participant picks a card.

The information on this card gives each participant his/her playing position: first, second, etc. and assigns a vowel cube playing piece. The participant who picks, say, the (a-1) card which is the lowest number will be the first player and will use vowel cube a. Whoever picks (e-2) will be next with vowel cube e and so on. The participant picking the (y-6) card will be the first monitor and the last to play. He/she will use vowel cube y. Lowest number, first player, highest number, last player and first monitor.

As each participant picks a playing position card, he/she may take the appropriate vowel cube. Any unused playing position cards remain with the bank.

Pads and Pencils

If player deems it necessary he/she may use the pad and pencil to jot down information received from the monitor, i.e. the vocabulary word and the five multiple choices.

GENERAL RULES

After each player has picked a playing position card and takes his/her vowel cube playing piece, the monitor takes charge of the card storage file and sets up the bank by turning the game paraphernalia cover upside down and placing in it all the game paraphernalia. Monitor controls the timer.

Monitor gives each participant a pad of paper, a pencil, scoring method card, three Free Pass Tokens and ten Point Tokens.

Monitor sets out die and color cube.

Each participant places his/her vowel cube playing piece on the starting position space. Let the fun begin.

Normal Play

Each player is allowed to roll the die and color cube three times each time it is his/her turn. Player may NOT retain die and color cube for more than three consecutive rolls.

If player rolls black on the color cube he/she forfeits turn and die and color cube pass to next player.

The first player rolls the die and color cube. Let's say die comes up five and color cube yellow. Player moves vowel cube playing piece in this instance, five spaces which lands vowel cube playing piece on "B".

Monitor takes alphabetical vocabulary card from "B" storage file and using "yellow" rolled by player on color cube reads the word to player along with the five multiple choice answers indicated by "yellow" on the reverse of the vocabulary card.

Monitor gives the player time to write down the word and multiple choices if player so desires.

Monitor then asks player "Do you wish to answer or pass?". If player chooses to answer Monitor starts timer.

If player chooses to answer he/she must give answer before timer sounds. If player's answer is correct he/she collects two points and retains die and color cube to roll again for a total of three rolls. Player will get two points for each of the three correct answers for a total of six points. If player answer any of the three words wrong it will result in the loss of two points each wrong word.

Wrong answers do not lose the player his/her turn, only points.

Monitor may, after quizzing player and receiving a "wrong answer", give the correct answer or ask the other "stand-by" players for the correct answer. This having been done the players might want to enter into a small discussion of the word and answer thus helping to make the "NEW" word a part of their own VOCABULARY.

This is an option the players may wish to use.

If player chooses to "pass" and he/she gives up a Free Pass Token, no points are lost. Player continues to roll die and color cube for remaining two rolls.

If player passes without using Free Pass Token player forfeits one point but continues to roll die and color cube for remaining two rolls.

Example

Player's first of three consecutive rolls a) Player answers correctly, get two points and makes second roll.

b) Player answers incorrectly, loses two points and makes second roll.

c) Player passes using Free Pass Token. No loss of points, player makes second roll.

d) Player passes without Free Pass Token, loses one point and makes second roll.

e) Player rolls black on color cube. Forfeits this and remaining two rolls, becomes monitor and die and color cube go to next player.

Player's second of three consecutive rolls - (Same).

Player's third and last roll. Same as first and second except die and color cube go to next player after completion of this roll.

Situation One

Rolling black on color cube

Player rolls the die and color cube. Die comes up five and color cube shows Black. When player rolls black he/she loses turn.

If player is unfortunate and rolls black on his/her first roll he/she forfeits all three rolls, becomes monitor and die and color cube pass to next player.

Situation Two

Landing on player's own vowel space

Say player's vowel cube playing piece is a. Player rolls the die and color cube. Move lands player on letter A space, which is player's vowel cube designation. Player automatically gets one point.

Landing on any other player's vowel space will not benefit anyone but the one holding that particular vowel cube playing piece.

Say the color cube came up yellow. The monitor takes alphabetical card A and next to the color yellow reads the word from the reverse of the card and the five multiple choice answers. Play resumes as described under NORMAL PLAY.

If player lands on own vowel space and color cube comes up black player loses his/her turn. Player still gets the one point for landing on own vowel space but he/she now becomes monitor and die and color cube pass to next player.

Situation Three

Landing on Starting Position (Star) space during play

The Starting position space has in it's corner a Star. Player's, when landing here as a result of a die roll have an opportunity to roll the Star Cube for extra points or Free Pass Tokens.

Die and color cube are rolled. Die lands player on Starting Position space, color cube comes up yellow. (REMEMBER COLOR).

Player now rolls die and Star Cube only, he/she already has the color. Player moves vowel cube playing piece number of spaces indicated by die. Say the letter landed on is B. The color is yellow. Monitor will quiz player on word resulting from this combination.

If the star comes up on the. Star Cube player will collect ten points *PROVIDED* he/she answers vocabulary word correctly. If player's answers is correct player is still entitled to the two points normally given for correct answers. This for a total of twelve points.

If player's answer is wrong he/she doesn't get the ten points and loses two points for an incorrect answer. Player continues to roll die and color cube for remaining rolls.

If color cube were to come up black as player landed on the Starting Position space, player loses opportunity to roll Star Cube and loses his/her turn. He/she then becomes monitor and dice and color cube pass to next player. Star Cube is returned to bank.

If Star Cube when rolled comes up white player receives three Free Pass Tokens and continues NORMAL PLAY.

LIST OF REFERENCE NUMBERS

| | |
|---|---|
| 10 | vocabulary board game |
| 12 | game board |
| 14 | continuous path on 12 |
| 15 | space in 14 |
| 16 | one alphabet letter |
| 18 | vowel letter |
| 20 | black border |
| 22 | starting position space |
| 24 | start in 22 |
| 26 | star in 22 |
| 28 | playing piece |
| 30 | vowel cube for 28 |
| 32 | number die |
| 34 | color cube |
| 36 | star cube |
| 38 | free pass token |
| 40 | point token |
| 42 | scoring method card |
| 44 | vocabulary card |
| 46 | first side of 44 |
| 48 | letter of the alphabet |
| 50 | word |
| 52 | color coded |
| 54 | second side of 44 |
| 56 | multiple choice answers for 50 |
| 58 | playing position card |
| 60 | timer |
| 62 | pencil |
| 64 | pad of paper |
| 66 | storage file for 44 |
| 67 | holder for 66 |
| 68 | game box |
| 70 | removable cover for 68 |
| 72 | game paraphernalia cover |

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A vocabulary board game, which comprises:
   a) a game board having a continuous path around its perimeter divided into consecutive spaces, each of said spaces bearing one letter of the alphabet with the vowel letters having a black border and a starting position space with the word "start" and a star at one corner of said game board; and
   b) a plurality of playing pieces one for each of the game players, said playing pieces being of a size to fit within each of said spaces on said game board, each said playing piece is a vowel cube identified on all sides of said vowel cube by one of the vowels, a, e, i, o, u and y.

2. A vocabulary board game as recited in claim 1, further including a six sided die having a different number on each of its sides, said number being selected from a sequence of numbers from one to six so as to indicate the movement of each said playing piece to a particular space in the path on said game board.

3. A vocabulary board game as recited in claim 2, further including a six-sided color cube having a different color on each of five of its six sides to correspond with the colors used in playing the game and a black color on its sixth side which indicates a lost turn.

4. A vocabulary board game as recited in claim 3, further including a star cube having a star on one side and a white color on an opposite side and used when a playing piece lands on said starting position space.

5. A vocabulary board game as recited in claim 4, further including a plurality of free pass tokens which are each white in color, three of said free pass tokens are given to each player at the start of the game.

6. A vocabulary board game as recited in claim 5, further including a plurality of point tokens, which are each orange in color, ten of said point tokens are given to each player at the start of the game.

7. A vocabulary board game as recited in claim 6, further including a plurality of scoring method cards, one of said scoring method cards are given to each player at the start of the game to help understand and follow the scoring during the game.

8. A vocabulary board game as recited in claim 7, further including a plurality of vocabulary cards, being divided into a plurality of decks, each said vocabulary card having on a first side, one letter of the alphabet except x and z, with a plurality of words starting with that letter and each of said plurality of words color coded, and having on a second side the plurality of color codes matching the first side and a plurality of multiple choice answers for each word with the correct answer for each word in bold lettering.

9. A vocabulary board game as recited in claim 8, further including a plurality of playing position cards, one of said playing position cards is taken by each player at the start of the game to determine who goes first, second, etc., who will be the first monitor and also let each player know which said playing piece to use.

10. A vocabulary board game as recited in claim 9, further including a timer which is activated by the monitor after a word from one said vocabulary card is given to the player, so as to time the player for an answer.

11. A vocabulary board game as recited in claim 10, further including:
 a) a plurality of pencils; and
 b) a plurality of pads of paper, so that each player may use one said pencil and one said pad to jot down information received from the monitor about the vocabulary word.

12. A vocabulary board games as recited in claim 10, further including a plurality of storage files, each for holding some of said decks of said vocabulary cards in an alphabetical order, so as to be used easily by the monitor.

* * * * *